United States Patent
Hansen

(10) Patent No.: US 10,746,700 B2
(45) Date of Patent: Aug. 18, 2020

(54) SYSTEM AND METHOD FOR PARTICULATE MATTER ANALYSIS

(71) Applicant: Magee Scientific Corporation, Berkeley, CA (US)

(72) Inventor: Anthony D.A. Hansen, Berkeley, CA (US)

(73) Assignee: Magee Scientific Corporation, Berkeley, CA (US)

( * ) Notice: Subject to any disclaimer, the term of this patent is extended or adjusted under 35 U.S.C. 154(b) by 18 days.

(21) Appl. No.: 15/977,976

(22) Filed: May 11, 2018

(65) Prior Publication Data

US 2018/0328889 A1 Nov. 15, 2018

Related U.S. Application Data

(60) Provisional application No. 62/505,773, filed on May 12, 2017.

(51) Int. Cl.
| | |
|---|---|
| *G01N 29/036* | (2006.01) |
| *G01N 15/06* | (2006.01) |
| *G01N 21/17* | (2006.01) |
| *G01N 29/24* | (2006.01) |
| *G01N 5/02* | (2006.01) |
| *G01N 15/00* | (2006.01) |

(52) U.S. Cl.
CPC .............. *G01N 29/036* (2013.01); *G01N 5/02* (2013.01); *G01N 15/06* (2013.01); *G01N 15/0606* (2013.01); *G01N 15/0612* (2013.01); *G01N 15/0656* (2013.01); *G01N 29/2418* (2013.01); *G01N 29/2437* (2013.01); *G01N 2015/0046* (2013.01); *G01N 2021/1708* (2013.01); *G01N 2291/0256* (2013.01); *G01N 2291/0427* (2013.01)

(58) Field of Classification Search
CPC ......... G01N 29/036; G01N 2291/0256; G01N 2291/0427; G01N 2291/0426; G01N 29/022; G01N 2021/1708; G01N 29/2418; G01N 15/0612; G01N 15/06; G01N 29/2437
USPC ....................................................... 73/28.01
See application file for complete search history.

(56) References Cited

U.S. PATENT DOCUMENTS

| | | | |
|---|---|---|---|
| 6,111,512 A * | 8/2000 | Sugimoto | G08B 17/10 340/511 |
| 7,168,292 B2 | 1/2007 | Gundel et al. | |
| 2004/0259267 A1* | 12/2004 | Gundel | G01N 5/02 436/178 |
| 2015/0293017 A1* | 10/2015 | Yamada | G01N 29/022 73/643 |

* cited by examiner

*Primary Examiner* — Eric S. McCall
*Assistant Examiner* — Timothy P Graves
(74) *Attorney, Agent, or Firm* — Steven R. Vosen

(57) ABSTRACT

A system and method are described for determining properties of particulates. The device collects particulates on the surface of an oscillating balance and compares the natural resonant frequency of the balance with the particulates with a balance without particulates. In addition, the collected particulates are illuminated with light that is absorbed by the particulates. This causes the balance to heat up, affecting the natural resonant frequency. A comparison of the natural resonant frequencies reveals optical properties of the collected particulates, which may be used to speciate the particulates.

24 Claims, 4 Drawing Sheets

SYSTEM AND METHOD FOR PARTICULATE MATTER ANALYSIS

CROSS-REFERENCE TO RELATED APPLICATIONS

This application claims the benefit of U.S. Provisional Application No. 62/505,773, filed May 12, 2017, the contents of which are hereby incorporated by reference in its entirety.

BACKGROUND OF THE INVENTION

Field of the Invention

This invention is related to devices for the identification of suspended airborne particulates.

Discussion of the Background

Certain types of balances utilize an acoustic wave resonator to determine the mass of material collected or placed on them. In such devices, the resonator is a cantilevered element having a sensor area to collect a mass of material to be weighed. Such resonators oscillate at a frequency (the "natural resonant frequency") that depends, in part, on the total weight—that is the weight of the cantilevered element plus the weight of the collected sample. With the resonator connected to an electronic oscillator circuit, the natural resonant frequency may be determined. Typically the natural resonant frequency depends on the temperature of the resonator, and so the temperature is typically controlled to minimize the effects of temperature on the measurement.

One device utilizing an acoustic wave resonator to measure mass is described in U.S. Pat. No. 7,168,292 (the "292 patent"), the contents of which are hereby incorporated by reference. In the device of the '292 patent', the resonator is a quartz crystal microbalance (QCM), or other mass-sensitive and temperature-compensated acoustic wave resonator. The resonator is connected to an electronic oscillator circuit which drives the oscillation of the oscillator at its natural frequency. Particulates in the air are driven to a collecting surface on the resonator, or an electrode on the resonator, using thermophoresis induced by a heated wire near the resonator.

As particulates are deposited onto the crystal, the mechanical loading reduces the natural resonant frequency of the QCM. The frequency of the sample-collecting crystal is then compared to that of a reference crystal to create a difference or "beat" frequency signal. Changes in this difference of the natural resonant frequency of the two crystals are used to determine a rate of mass collection, which is related to the mass concentration of particulates in the surrounding air. Alternately, the natural resonant frequency may be determined by other means. The rate of frequency change can be easily determined by electronic means, to represent a measurement of the mass concentration of particulates in the air. These resonators and resonator circuits are known in the art.

While devices such as those described in the '292 patent' are capable of determining a total amount of mass collected, they are not capable of determining what types of particulates have been collected. There exists a need for an inexpensive device that can determine properties of particulates.

BRIEF SUMMARY OF THE INVENTION

Embodiments of the present invention provide a mass detection system that illuminates particulates collected on resonator with light that includes wavelengths absorbed by the particulates. If a fraction of the collected particulates absorb the light, they will absorb energy and their temperature will increase. This energy will be transmitted to the resonator and consequently the temperature of the resonator will increase. The change in resonator temperature will change its mechanical elastic properties, and result in a change in the oscillation frequency of the resonator. It is well-known and described in the '292 patent' that the natural oscillation frequency of these resonator elements is very sensitive to temperature. By measuring changes in oscillation frequency with illumination, it is thus possible to obtain detailed information on the physical characteristic of the particulates, and in some circumstances determine the amount and type of particulates.

Certain embodiments provide a system that, in addition to determining the mass collected, also measures properties of a sample of collected particulates. The system includes a device for measuring the mass of the sample of collected particulates, where the device includes a surface for collecting the sample, where the surface is the surface of an element capable of oscillating, and an electronic circuit for determining a frequency of oscillation of the collecting element; a source of electromagnetic radiation configured to direct electromagnetic radiation on the surface; and a processor programmed to control the wavelength of the directed electromagnetic radiation and to measure the corresponding change in the frequency of oscillation.

Certain embodiments provide a system for measuring properties of a sample of collected particulates. The system includes a first resonator including a first surface configured to accept the sample and a first electronic oscillator circuit having a first output proportional to a first natural resonant frequency of the first resonator; a second resonator including a second surface that is configured to not accept the sample and a second electronic oscillator circuit having a second output proportional to a second natural resonant frequency of the second resonator; a third resonator including a third surface having an optical coating and configured to not accept the sample and a third electronic oscillator circuit having a third output proportional to a third natural resonant frequency of the third resonator; and a source of electromagnetic radiation configured to illuminate the first surface, the second surface, and the third surface. The system also includes a processor programmed to control the illumination of the first surface, the second surface, and the third surface by the source of electromagnetic radiation, accept the first output, the second output, and the third output, and determine a property of the sample accepted on the first surface.

Certain other embodiments provide a system for measuring properties of a sample of collected particulates. The system includes: two or more resonators each including a surface, an electronic oscillator circuit having an output proportional to a natural resonant frequency of the resonator, and an associated source of electromagnetic radiation configured to illuminate the surface, where a first resonator of the two or more resonators includes a first resonator having a first surface configured to accept the sample, and where a second resonator of the two or more resonators includes a second resonator having a second surface configured to not accept the sample. The system also includes a processor programmed to control the illumination of the first surface and the second surface by the source of electromagnetic radiation, accept the output from the electronic circuit of the first resonator and the output from the electronic circuit of the second resonator, and determine a property of the sample accepted on the first surface.

Yet another embodiment provides a method for measuring properties of a sample of collected particulates with a device including a computer, one or more resonators, and one or more electronic oscillator circuits having an output proportional to a natural resonant frequency of the resonator. The method includes: measuring a first natural resonant frequency of a first resonator with an electronic oscillator circuit, where the first resonator includes a surface having collected particulates, where the measuring is performed while the surface is illuminated with electromagnetic radiation of a first wavelength that is at least partially absorbed by the collected particulates; measuring a second natural resonant frequency of a second resonator with an electronic oscillator circuit, where the second resonator does not have collected particulates, where the measuring is performed while the surface is illuminated with electromagnetic radiation of the first wavelength; measuring a third natural resonant frequency of a third resonator with an electronic oscillator circuit, where the third resonator has an optical coating on the surface and does not include collected particulates, and were the measuring is performed while the surface is illuminated with electromagnetic radiation at the first wavelength; and determining, according to programming of the computer and comparison of these outputs, a property of the sample accepted on the first surface.

These features together with the various ancillary provisions and features which will become apparent to those skilled in the art from the following detailed description, are attained by the system and method for measuring particulates of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

As described herein, embodiments include a mass detection system that collects particulates and obtains detailed information on physical characteristics of the particulates and which, in some circumstances, may speciate the particulates and discriminate one type from another. As is further described herein, the mass detection system operates by illuminating particulates collected on a resonator with light of differing wavelengths, that may be absorbed to a greater or lesser degree. The resulting temperature increase of the underlying resonator produces a response that is wavelength dependent, and which may be used to characterize the collected particulates.

Figure 1:
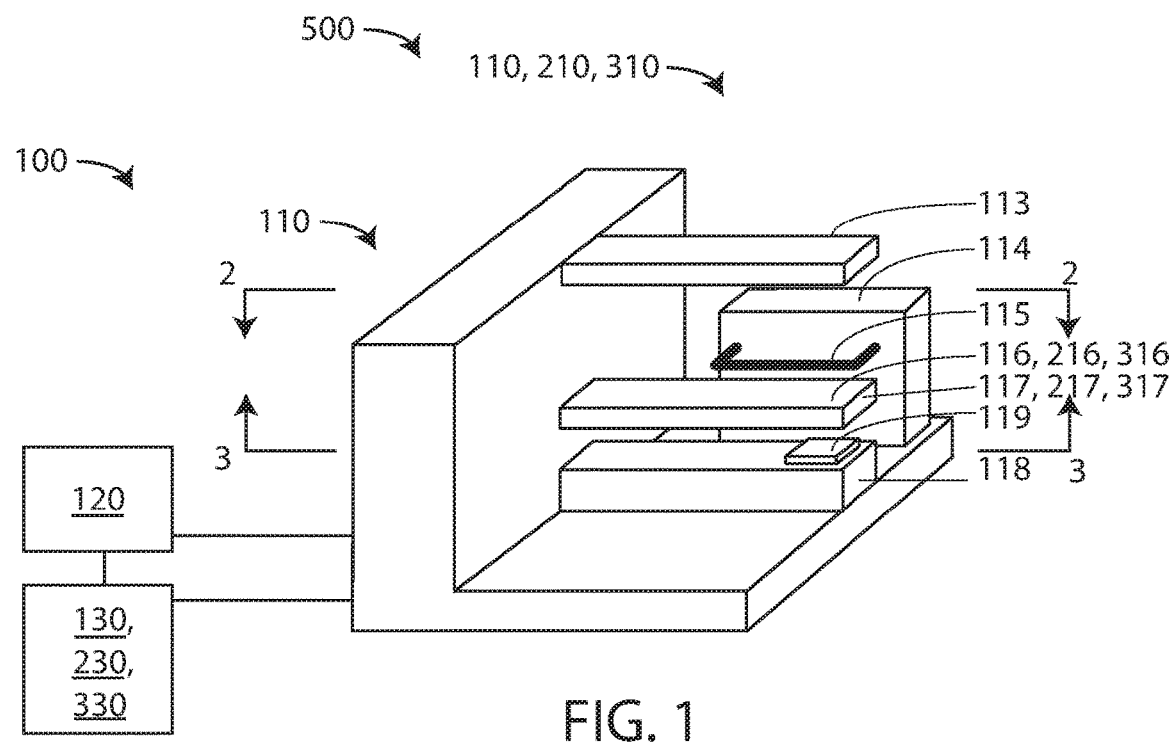
FIG. 1 is a perspective view of a first and second embodiment of a mass detection system.
Figure 2:
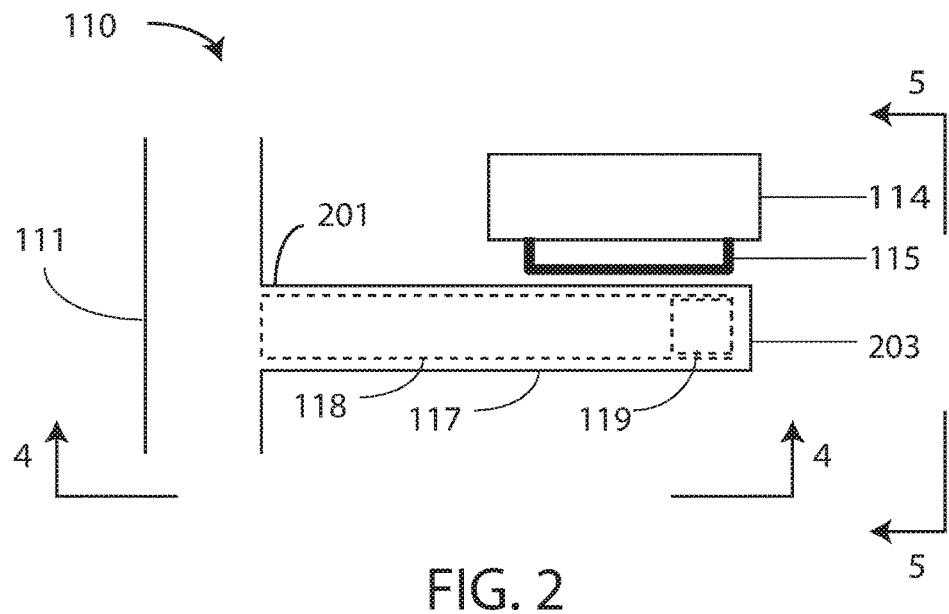
FIG. 2 is a top view 2-2 of FIG. 1.
Figure 3:
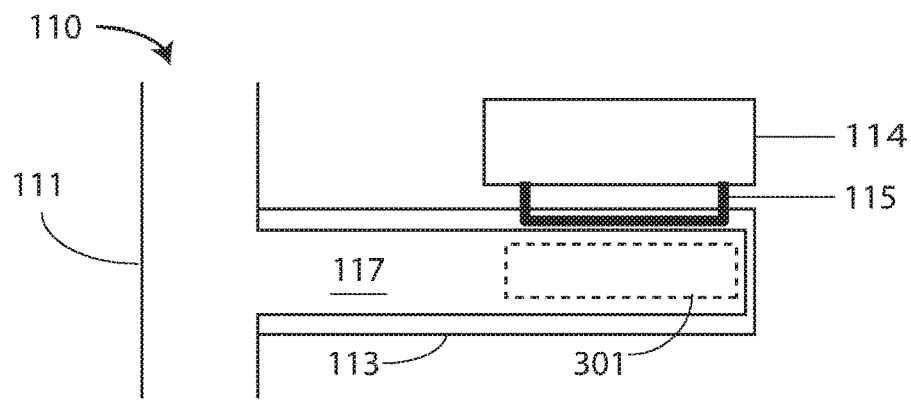
FIG. 3 is a bottom view 3-3 of FIG. 1.
Figure 4:
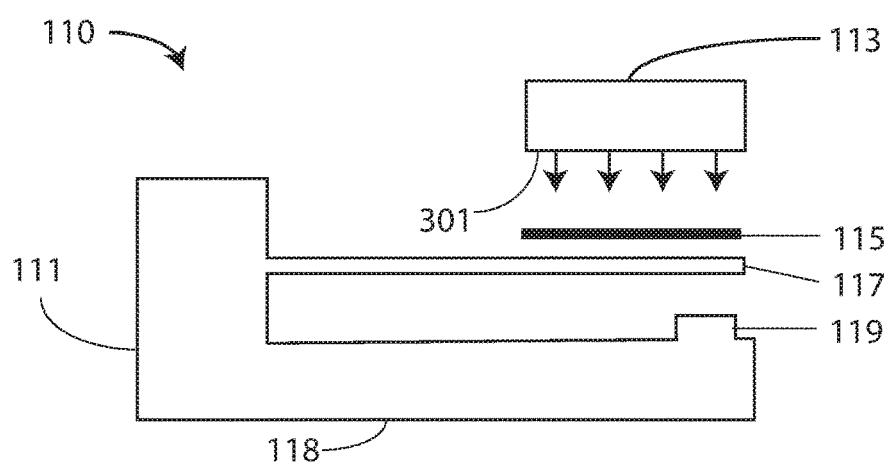
FIG. 4 is a side view 4-4 of FIG. 2.
Figure 5:
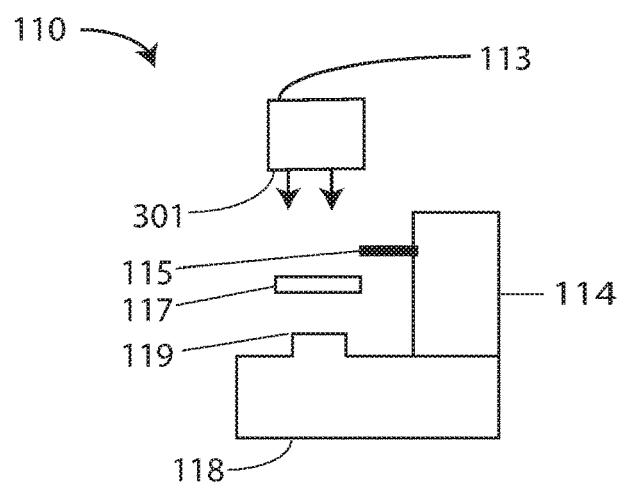
FIG. 5 is an end view 5-5 of FIG. 2.

Several views of a first embodiment of mass detection system 100 are illustrated in FIG. 1, which is a perspective view of the mass detection system, FIG. 2 as a top view 2-2 of FIG. 1, FIG. 3 as a bottom view 3-3 of FIG. 1, FIG. 4 as a side view 4-4 of FIG. 2, and FIG. 5 as an end view 5-5 of FIG. 2.

Mass detection system 100 includes a balance 110 and a programmable computer 120. Balance 110 includes a body 111, a resonator 117, a base 118, an electrode 119, and an electronic oscillator circuit 130.

Resonator 117 has a surface 116, referred to herein without limitation as a top surface, some or all of which that may be used to collect particulates. In an alternative embodiment, some or all of surface 116 is provided with a coating, as described subsequently. Optional components of balance 110 include, but are not limited to, a light source support 113 having an light source 301, a heater support 114 for a thermophoretic element 115 whose purpose is to precipitate particles from the atmosphere onto the surface.

As described subsequently, electronic oscillator circuit 130 determines the natural oscillating frequency of resonator 117 and computer 120 controls any thermophoretic element 115 and light source 113 and obtains data from the resonator and determines properties of collected particulates from that data and alternatively using information about operation of light source 301.

Resonator 117 is, in certain embodiments, a flexible rectangular bar of silicon material, whose length is greater than its width, and whose thickness is considerably less than either of these dimensions. As illustrated in FIG. 2, resonator 117 is attached at an end 201 to the substrate material, while the other end 203 is freely suspended. Resonator 117 has a natural resonant frequency of mechanical oscillation that, for preferred embodiments, may typically be on the order of gigahertz. This oscillation may be induced by applying an oscillating voltage, from electronic oscillator circuit 130, to electrode 119, which is in proximity to end 203. When the frequency of the voltage applied to this electrode is at the resonant frequency of resonator 117, the oscillation is maximized. The combination of electrode 119 and end 203 creates a capacitor which is incorporated into the electronic oscillator circuit 130 to maintain the oscillation at the resonant frequency. In certain embodiments, end 203 also includes an electrode as part of electronic oscillator circuit 130.

In one embodiment, resonator 117 is a quartz crystal microbalance (QCM) mass sensor that is also employed as a particulate matter deposition surface. The particulate matter is collected on surface 116 of resonator 117, which is also referred to herein as the "collector element." The resonator is connected to an electronic oscillator circuit. As particulate mass is deposited onto the crystal, mechanical loading reduces the natural resonant frequency of the crystal. This frequency is detected, as discussed subsequently, and is used to determine qualities of the collected particulate matter. The rate of frequency change can be easily determined by electronic means using resonators and resonator circuits that are known in the art. It is understood that the term "surface" of the resonator may be an electrode of the resonator.

The present invention contemplates that, in addition to quartz, other materials may be used as a piezoelectric material. Instead of the quartz crystal microbalance surface the surface material may be Rochelle salts, tourmaline, synthetic crystals such as ethylenediamine tartrate (EDT), dipotassium tartrate (DKT), ammonium dihydrogen phosphate (ATP), ferro electric polymers such as polyvinylidene-fluoride (PVDF), polycrystalline ceramic such as lead zirconium titanate ($PbZrTiO_3$), and other crystalline structures such as Zinc Oxide (ZnO), Aluminum Nitride (AlN), Barium Titanate ($BaTiO_3$), Lithium Niobate ($LiNbO_3$) and Lithium Tantalate ($LiTaO_3$).

In certain embodiment, airborne particulates may be induced to settle on surface 116 by a variety of mechanisms including mechanical impaction, thermophoresis, and other methods. These methods precipitate particulates from the airstream onto the oscillating bar, where their mass is detected. In this specification, we illustrate, without limitation, the use of thermophoresis to precipitate particulates by means of a heated element in close proximity to the collecting element.

In certain embodiments, thermophoretic element 115 is used to increase the amount of particulates deposited on surface 116 via thermophoresis. Thermophoretic element 115, is also termed herein "collection wire", "collector wire", "heating wire", "wire" or "thermophoretic collection device." It is understood that the present invention contemplates that the thermophoretic element need only be in proximity to the resonator surface; and by "in proximity" it is meant that during operation of the device at least some of any present particulate matter is deposited on the resonator surface. The invention contemplates that the thermophoretic element or other thermophoretic heated surface may be above, next to or below the surface. The element may be disposed parallel, or at another non-orthogonal angle to the surface.

In one embodiment of the present invention the temperature gradient is produced between heated thermophoretic element 115, which preferably a wire, a series of wires, or other thermophoretic heated surface, and surface 116. For example, the thermophoretic element 115 may include a metal strip such as a ribbon, which may have a rectangular shape. The invention also contemplates that a light transmissive metal film or a substrate with a conductive coating be used as the thermophoretic element. The film may be anywhere from 0.1 micron or thicker. The coating may be any thickness desired. For example, there may be an indium tin oxide (ITO) coating on a substrate, such as a glass substrate. This light transmissive metal film may be patterned by techniques known in the art such as lithography. In one embodiment the thermophoretic element may be encased coaxially in an element comprising the resonator, but with an appropriate space between the thermophoretic element and the resonator surface. In one embodiment of the present invention there is used a nickel alloy wire as the thermophoretic element, 25 μm diameter and 15 mm long, stretched parallel to a quartz crystal surface at a distance of 0.5 mm. This configuration will precipitate particulates directly from the surrounding ambient atmosphere without the need for pumping the air stream.

Theromophoretic particulate collection efficiency increases with increasing temperature gradient between the thermophoretic element and the collection surface. Preferably, the temperature gradient is as high as possible without damaging the device structure or inappropriately altering the particulate sample. Measurements made with a 10 μm diameter thermocouple indicated that the temperature difference between the heating wire and the crystal surface was only 5° C. Preferably the temperature gradient is greater than 5° C. In one embodiment of the present invention it is contemplated to decrease the temperature of the resonator by attaching it to a heat sink, preferably a finned aluminum block. However, placing a metal block in contact with some resonator types would dampen its vibration and substantially decrease its sensitivity to deposited mass. Heat can also be transferred via radiation and convection, although not as effectively as with as metal-to-metal conduction. Selection of resonators that can be solidly mounted to a high thermal conductivity surface without hampering their freedom to resonate, but allowing improved heat transfer is possible. The temperature gradient can be increased by cooling the surface of the acoustic wave resonator surface or quartz crystal microbalance surface or heating the thermophoretic element. Means for accomplishing this heating and/or cooling are known in the art.

In certain embodiments, light source 301 produces electromagnetic radiation, or light, of known wavelengths that illuminates particulates on surface 116. Certain types of particulates may absorb light: while other common types of airborne particulates (such as dust; sea-spray salt; inorganic compounds (sulfates, nitrates, etc.) produced in atmospheric hazes; etc. do not absorb light. Of greater importance is the fact that of the particulates which do absorb light, a further discrimination is afforded by performing the test at differing wavelengths of light. The absorption spectra of the classes of particulates mentioned above varies; and is substantially different in form; across the spectrum from (for example) 370 nm (ultraviolet) to 950 nm, (infra-red) representing the spectrum range of wavelengths of illumination available from miniature light sources.

As is known in the art, the resonant frequency of resonator 117 will vary with temperature of the resonator. As described subsequently, the response of resonator 117 to light source 301 will depend on the light absorption characteristics of the particulates. As described subsequently, the response of resonator 117 will be affected by light source 301 for light that is absorbed by the particulates, and thus mass detection system 100 is capable of performing multiple measurements on a sample of particulates and uses the multiple measurements to infer details of the collected sample.

Further details of thermophoretic element 115, resonator 117, electrode 119, and electronic oscillator circuit 130 may be found in the '292 patent'

Certain embodiments provide a device and method whereby a balance may be operated to advantageously provide an identification of certain types of airborne particulates. The ability to speciate the particulates and discriminate one type from another will lead to a greatly increased value of the data. Examples of airborne particulates which may be identified by devices of present invention include, but not limited to, the following illustrative examples:

- mists of oil droplets, produced by pinhole leaks in high-pressure hydraulic systems: rapid detection of these events is of value to the managers of enclosed environments such as submarines, sealed military vehicles (including tanks), etc.;
- particulates produced by biomass combustion, in enclosed environments as mentioned above: in particular, the pervasive (yet forbidden) problem of cigarette smoking on board submarines;
- particulates produced by biomass combustion, in environments where the inhabitants of an enclosed space must be protected from associated toxic components: examples include the infiltration of forest-fire smoke into schools, hospitals, medical care facilities etc.; and
- particulates produced by fossil-fuel combustion, in both indoor, outdoor, and enclosed-space environments: examples include the detection of Diesel Particulate Matter (DPM), a listed Air Toxic.

Thus for example, the following list provides some optical differences between different types of particulates that may form the basis for speciation by optical properties. For the purposes of illustration, but without exclusion or limitation, the following general classes of suspended particulates have the following properties that would be registered by the data outputs mentioned above:

Diesel Exhaust Particulate Matter:
  Low mass
  Strong optical absorption at all wavelengths equally
Smoke from Wood Combustion:
  Moderate mass
  Low (but measurable) optical absorption at long wavelengths
  Smoothly-increasing optical absorption at shorter wavelengths
Mineral Dust:
  Large mass
  Small optical absorption at long wavelengths
  Very small optical absorption at short wavelengths
Tobacco Smoke:
  Moderate mass
  Zero optical absorption at medium and long wavelengths
  Very strong optical absorption at the shortest wavelengths (blue, near-UV)
Hydraulic Oil Mist:
  Moderate mass
  (Possibly) small optical absorption at long wavelengths, depending on formulation
  Larger optical absorption at intermediate wavelengths
  Strong optical absorption at short wavelengths
Sea Spray Haze:
  Large mass
  Zero optical absorption at all wavelengths
Secondary Organic Carbon aerosols:
  Moderate mass
  Zero optical absorption at all wavelengths
Inorganic aerosols (Sulfates, Nitrates, etc.):
  Moderate mass
  Zero optical absorption at all wavelengths More specifically, mass detection system 100 including light source 113 utilizes the absorption of light by the particulate at differing wavelengths of illumination to produce a microscopic and localized heating of the sensing element of the mass detector, if optically-absorbing particulates are present. This heating will change the response of the detector proportional to the amount of material having the optical absorption at that wavelength. By switching power from one optical source of one wavelength, to another source of another wavelength, a sequence of wavelengths of illumination can be used to interrogate the particulates collected on the detector within a short period of time. Comparison of the responses at the different wavelengths will yield the absorption spectrum of the collected material. This absorption spectrum—or the absence of any absorption—will provide additional information about the nature of the collected particulates. A comparison of the measured absorption spectra with the known absorption spectra of possible particulate material may form the basis for determining the type of material based on the measured absorption spectra.

If an optically-scattering (reflecting) particulate such as an ammonium nitrate-sulfate compound (frequently found in atmospheric haze) is deposited onto surface 116, the natural oscillating frequency of resonator 117 will be reduced due to the change in mass. When surface 116 is illuminated, however, the particulates will not absorb the incident light, and thus the resonator temperature will not change. On the other hand, if an optically-absorbing particulate such as diesel exhaust particulate matter (DPM) is deposited onto surface 116 the natural oscillating frequency of resonator 117 will be reduced due to the change in mass. When surface 116 illuminated, it will absorb a fraction of the incident light causing the temperature of resonator 117 to increase.

The principle of the detection of optically-absorbing suspended aerosol particulates based on the conversion of absorbed optical energy into heat is well developed in the 'photo-acoustic method' for the detection of suspended aerosol particulates. In said method, the absorption of light by particulates suspended in an air stream leads to a localized heating of the air surrounding the particulate. If the illumination is modulated in its intensity (typically in an on-off cycle), a pressure wave is created which may be detected as an acoustic signal.

In certain embodiments, the absorption of energy leads to a localized heating of the particulate attached to the surface of the detector resonator bar. A fraction of this energy will be conducted to the material of the bar, leading to an increase in the temperature of the bar. This increase in temperature will, in turn, modify the elasticity of the material from which the bar is fabricated, leading to a change in the resonant frequency. It is well known that the oscillation frequency of microfabricated mechanical resonators is strongly influenced by temperature. This change in resonant frequency may be detected by the oscillator circuit connected to the driving electrode.

If the illumination is of surface 116 is modulated, for example by repeating an on-off pattern by switching the power the light source on and off; the changes in resonant frequency will follow the pattern of {illumination-heating-change in resonator elasticity}. Since the mechanical dimensions of the system are extremely small, the change in resonator frequency will quickly follow the illumination and heating. Thus, illumination of surface 116 may be modulated (switched on and off) at a suitable rate, and the change in resonator frequency may be detected in synchronism at this rate. Examples of measurements which may be made are presented in the subsequent discussion of mass detection system 500 and mass detection system 600.

In a second embodiment, mass detection system 500 is utilized with two other similar systems, as illustrated in FIG. 1, which operated slightly differently, and which in combination greatly improve the sensitivity of the optical absorption analysis by eliminating unknown aspects of the optical response of the detector that improves the performance of the mass detection system.

Mass detection system 500 includes: 1) computer 120; 2) balance 110, as described above as including includes resonator 117 having surface 116, light source support 113 having light source 301, heater support 114 for thermophoretic element 115, and oscillator circuit 130 in communication with the computer; 3) a system baseline reference detector 210 including a resonator 217 having a surface 216, and an electronic oscillator circuit 230 in communication with the computer; and 4) a system intensity reference detector 310 including includes a resonator 317 having a surface 316, and including an electronic oscillator circuit 330 in communication with the computer. In addition, balance 110, system baseline reference detector 210 and system intensity reference detector 310 include electrodes, such as electrode 119 as part of each oscillator circuit.

System baseline reference detector 210 is configured to not collect any particulates. Accordingly, system baseline reference detector 210 does not include thermophoretic element 115, or does not provide power to thermophoretic element 115. A comparison of the oscillation frequencies of mass detection system balance 110 and system baseline reference detector 210 thus allows for the absorption of light by surface 216 to be accounted for or corrected for. If the intrinsic material of the detector of system baseline reference detector 210 has a response to illumination by light, the system baseline reference detector 210 will change its response in a manner identical to that of mass detection system 100. The difference between these two responses will eliminate any possible intrinsic response of the system, and will represent only the effect due to the collected particulates.

System intensity reference detector 310 is configured to not collect any particulates and also has a very thin layer of optically-absorbing material (such as a metal oxide) deposited on surface 316 at the same location as the area of collection of suspended particulates by mass detection system 100. Accordingly, system intensity reference detector 310 does not include thermophoretic element 115, or does not provide power to thermophoretic element 115. System intensity reference detector 310 will absorb light of all wavelengths, and will produce a response proportional to the intensity of the illumination. In this way, it is possible to control for changes in the intensity of illumination produced by each of the several sources.

There are multiplicities of data outputs which may be derived from the signals produced by the array of detection elements described above. The following calculations are performed according to programming in computer 120 from the output of electronic oscillator circuits 130, 230, and 330 and the controlled frequencies of light source 301.

The fundamental "mass" output [M] represents the total mass of suspended particulates collected by mass detection system 100.

The first "optical absorption" output [OA1(L)], represents the optical absorption of the deposit of particulates collected on mass detection system 100, together with any response of the detection system itself to the illumination by light. That is, OA1(L) is the natural resonant frequency of resonator 117 as determined by electronic oscillator circuit 130, where the suffix (L) indicates that this measurement is obtained under illumination by a source of optical wavelength (L), which may be sequenced through a multiplicity of optical sources, emitting light at different wavelengths (L).

The system baseline reference detector 210 output [OA2(L)] is the natural resonant frequency of resonator 217 as determined by electronic oscillator circuit 230, and represents the response of the detection system itself to the illumination by light. The difference between this output [OA2] and the collecting detector's output [OA1] is the amount of response attributable to the collected particulates, after elimination of the system response itself. As above, the suffix (L) indicates that this measurement is obtained under illumination by a source of optical wavelength (L) which may be sequenced through a multiplicity of optical sources, emitting light at different wavelengths (L).

The system intensity reference detector 310 output [OA3(L)] is the natural resonant frequency of resonator 317 as determined by electronic oscillator circuit 330, and represents a measure of the intensity of illumination, which may not necessarily always be constant. As above, the suffix (L) indicates that this measurement is obtained under illumination by a source of optical wavelength (L) which may be sequenced through a multiplicity of optical sources, emitting light at different wavelengths (L).

Measurement of Optical Absorption

The difference $\{OA2(L)-OA1(L)\}$ represents a signal due to the absorption of light of wavelength (L) by particulates collected by mass detection system 100. If no particulates were present on the collector element; or if the particulates which were present, had zero optical absorption; its response to illumination would be identical to that of the "baseline reference", and this difference would be zero.

The difference $\{OA3(L)-OA2(L)\}$ represents a signal due to the absorption of light of wavelength (L) by the system intensity reference detector 310, with light absorbed by a fixed deposit of material, relative to the intrinsic response of the elements themselves. If the intensity of the source (L) is not precisely stable, this signal provides a normalization to correct for the change in intensity.

The quantity $\{OA2(L)-OA1(L)\}/\{OA3(L)-OA2(L)\}=A(L)$ is a measure of the absorption of light at wavelength (L) attributable to the deposit of particulates on the collecting element of mass detection system 100, after correction for the intrinsic response of the system itself to illumination and normalized against possible fluctuations in the intensity of illumination. This measures the fundamental attribute of optical absorption by the accumulation of particulates on the collecting element, proportional to the quantity of these particulates, combined with the strength of their absorption per unit mass.

Multiple Components of Optical Absorption

The quantity A(L) defined above is a measure of optical absorption by the collection of particulates on the detector element of mass detection system 100. If more than one type of particulate is collected, and if the different particulates have different characteristics of optical absorption at different wavelengths, then to first order (before the optical absorption becomes saturated) the net total measured optical absorption A(L) will be the sum of the optical absorptions $A(L, 1)+A(L, 2)+A(L, 3) \ldots$ represented as $\Sigma A(L, i)$ where the suffix (i) represents the different species (i) of particulates, which may be present in different quantities and which may have different optical absorptions at different wavelengths L.

Combination of Multiple Components of Optical Absorption

The optical absorption due to mass M(i) of species (i) of particulates at wavelength L is proportional to the mass multiplied by a wavelength specific absorption coefficient $\sigma(i, L)$. The absorption coefficients $\sigma$ are determined empirically by comparing the optical measurement with a parallel physical or chemical measurement. In many actual cases, different species (i) may have widely varying absorption coefficients $\sigma(i, L)$ such that a small mass of highly-absorbing material may provide more absorption signal than a larger mass of more weakly-absorbing material. However, it is generally found that clearly distinct classes of materials have very different dependences of their optical absorption on wavelength L. Thus, the components of a combination of materials may be separated by determining the wavelength dependence of the absorption created by the combination.

Measurement of Rate of Accumulation in the Case of a Single Species

The measurement A(L) defined above, is measured at a particular time. However, in dynamical operation, the detector element is accumulating particulates continuously. Thus, A(L) will generally increase with time t, as the accumulation increases, denoted as A(L, t).

The change in signal from one time to the next, will be proportional to the change in the amount of optical absorption accumulated on the detector. If the detector is increasing its accumulation of particulates due to active deposition, then (in general) A(L, t) will increase with time. The increase over time interval j is {A(L, [t+j])−A(L, t)}. If the rate of deposition of particulates is proportional to the concentration of said particulates in the sampled air stream; and if the proportional rate of deposition is non-selective, i.e. if all particulates in the sampled air stream have the same probability of being collected; then the rate of increase of the optical absorption signal A at each wavelength L will be proportional to the concentration of the particulates in the sampled air stream. The concentration is denoted as C (L, t)=f*d/dt {A(L, t)}, where the factor f represents the proportionality of sampling, collection efficiency, the optical absorption coefficient σ, the mass of material, and other factors; and is explicitly measured at a specific wavelength L.

Interpretation of Rate of Accumulation as a Function of Wavelength

The above definitions of derived quantities may be expanded to cover the range of wavelengths of light used to illuminate the deposit on the collector to represent the situation where the actual suspended aerosol consists of a mixture of different types of particulates having different optical absorption coefficients at different wavelengths of light. Depending on the identifiable differences between optical absorption coefficients σ (i, L) for the species (i) at optical wavelengths L, it may be possible to separate the components of a mixture of species.

Combination of Optical Absorption and Mass Measurements

The detector element of mass detection system 100 fundamentally responds to the amount of mass accumulated on it. The changes in its response due to optical absorption at different wavelengths add further dimensions to the measurement. However, these changes due to optical absorption may be combined with the fundamental measurement of particulate mass, to yield additional information. The {rate of increase of optical absorption} at {wavelength L} per {rate of accumulation of mass} may be an indicator of the nature of the particulates collected.

Dimensions of Data Calculated by System

The system to be described, can offer multiple simultaneous measurements. These measurements may be combined by deconvolution or expert algorithms to provide a measure or estimate of the presence of species of particulates in the sampled air stream. It is a major innovation of this invention that the analysis of optical absorption contributes additional dimensions to the real-time data output of the sensing system. The data outputs include: total mass of collected particulates, and/or optical absorption of collected particulates at multiple wavelengths L.

Alternative Embodiments

Figure 6:
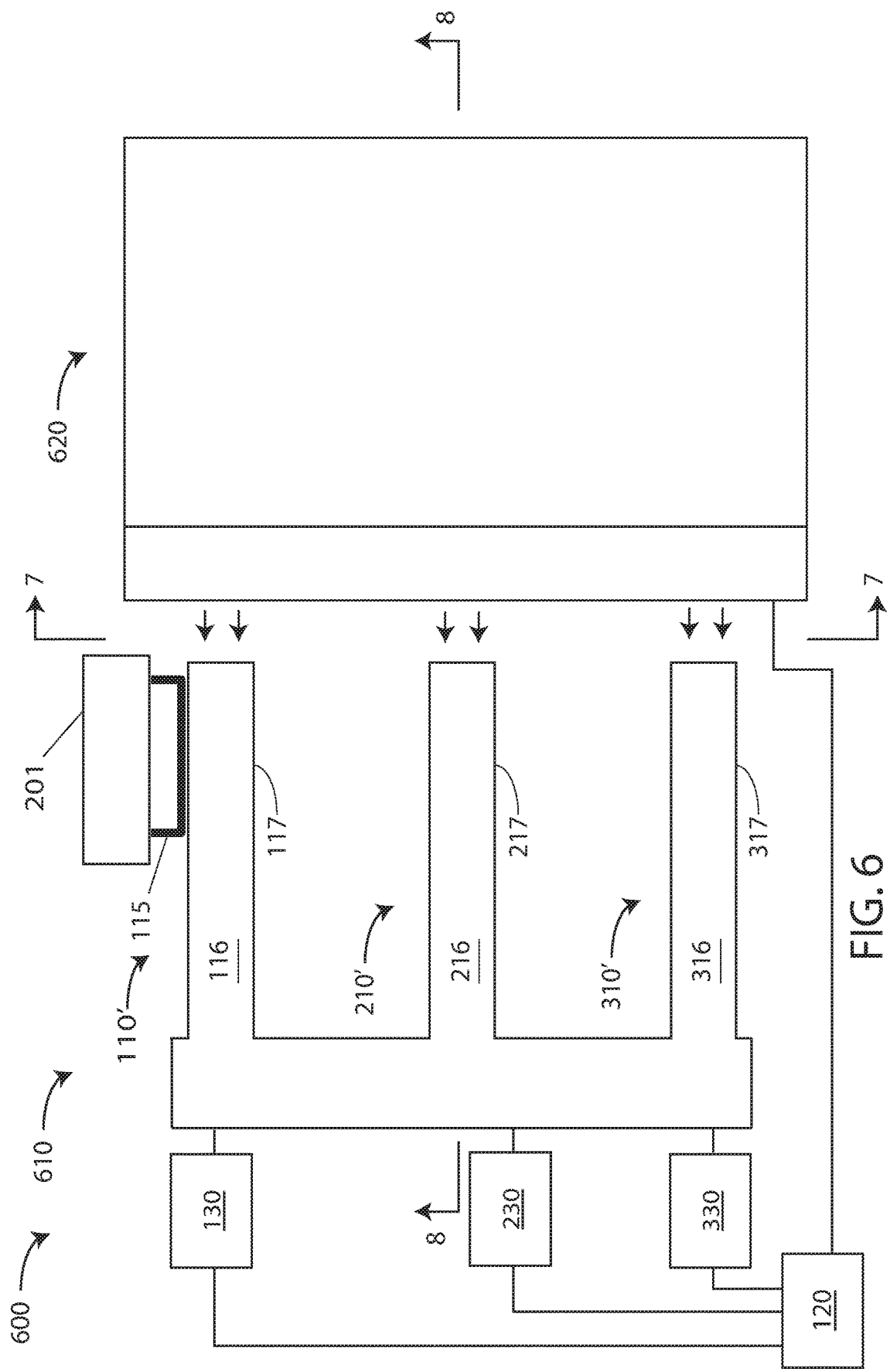
FIG. 6 is a top view of a third embodiment of a mass detection system.
Figure 7:
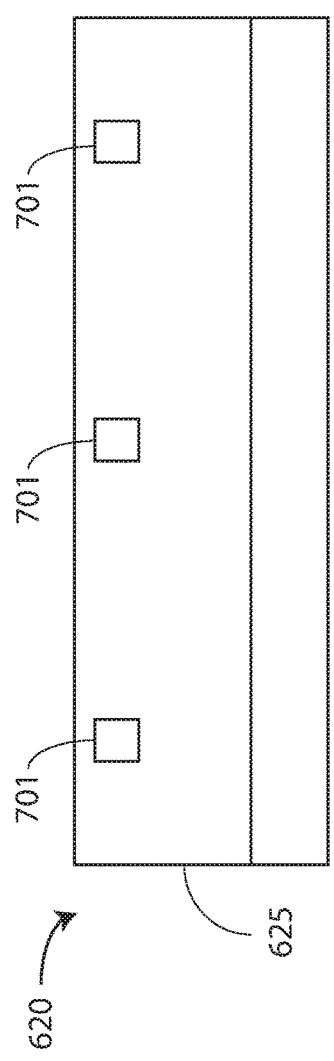
FIG. 7 is a front view 7-7 of FIG. 6.
Figure 8:
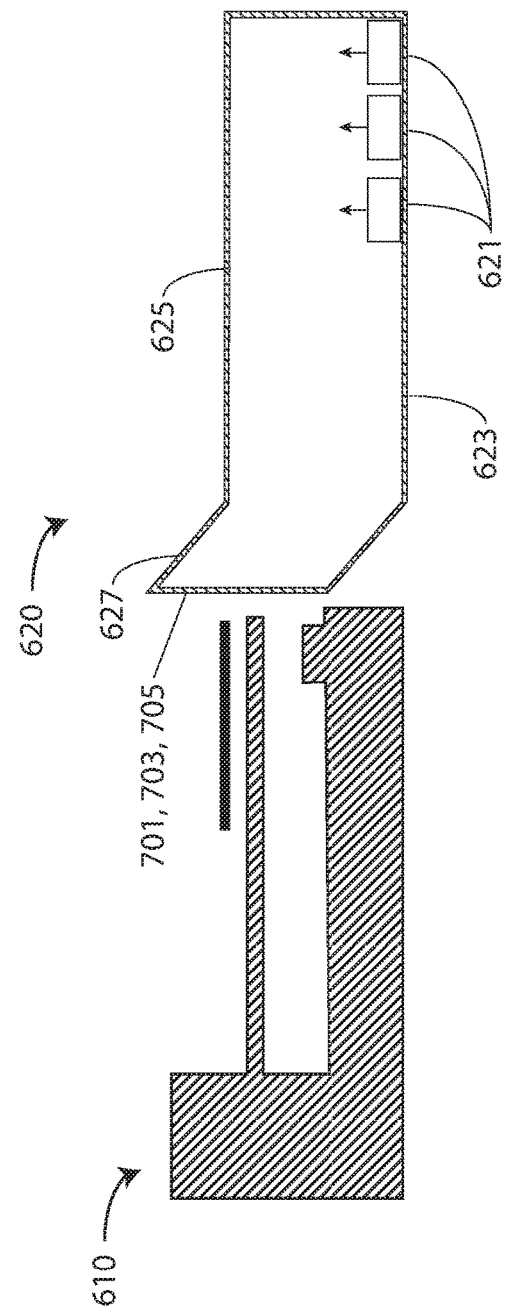
FIG. 8 is a side sectional view 8-8 of FIG. 6.

A third embodiment mass detection system 600 is illustrated in the top view of FIG. 6, the front view 7-7 in FIG. 7, and the side sectional view 8-8 in FIG. 8.

Mass detection system 600 includes balances 610, which include a mass detection system balance 110', a system baseline reference detector 210', and a system intensity reference detector 310', and electronic oscillator circuits 130, 230, and 330, respectively. Balance 110' and detectors 210', and 310' are similar to balance 110 and detectors 210, and 310, except that they do not include light source support 113 or light source 301. Instead, mass detection system 600 includes an illumination assembly 620, which is used to simultaneously illuminate the resonators 117 of balance 110' and detectors 210', and 310'. Mass detection system balance 110' has a surface 116, system baseline reference detector 210' has a surface 216, and system intensity reference detector 310' has a surface 316 on their respective resonators. Balance 110' and detectors 210', and 310' also include electrodes, such as electrode 119, which is not visible in FIGS. 6-8.

Mass detection system 600 also includes computer 120 which receives outputs from electronic oscillator circuits 130, 230, and 330, and controls thermophoretic element 115 and illumination assembly 610. The operation of mass detection system 600 is generally similar to that of mass detection system 500, except as explicitly stated.

Illumination assembly 620 includes a number of surface-mounted LED emitting chip die elements, or LED emitters 621, that produce light of different wavelengths, as controlled by computer 120. Die elements 610 are attached to the base plane 623 with suitable electrical connections. It is desirable to have an intermingled multiplicity of emitters for each of the L wavelengths, so that the illumination at that wavelength is spatially more homogeneous.

Illumination assembly 620 a reflecting light guide enclosure 625 that is installed over the LED emitters 621 and adjacent to balances 610. reflecting light guide enclosure 625 light guide is fabricated of transparent material, and is coated externally with a material that is highly reflecting on the inner surface. In this way, the light emitted from the LED emitters 621 is contained within a multiply-reflecting and homogenizing enclosure. This enclosure is formed with three windows 701, 703, and 705 in the reflective coating, each of which is aligned closely with an end 203 of balance 110 and detectors 210, and 310, respectively. An upper surface 627 of light guide enclosure 625 is formed at a suitable angle so that the light intensity contained within the light guide enclosure is directed through windows 701, 703, and 705 and onto surfaces 116, 216, and 316 respectively.

When power is applied to each set of LED emitters 621, their optical output is contained and homogenized within reflecting light guide enclosure 625. This optical energy can escape through the three windows 701, 703, and 705 to illuminate the surfaces 116, 216, and 316. LED emitters 621 may be turned ON and OFF quickly by computer 120, so that any effect of the modulation of their light intensity onto the oscillators can be detected as a frequency change in synchronism with the illumination power.

The chip die sets of LED emitters 621 may be pre-formed in separate manufacturing processes for the various wavelengths desired; and the attached to the surface of the oscillator body block using conventional semiconductor fabrication methods. The physical size of this grouping of LED emitters 621 may (in principle) be larger than the overall dimension of the illumination assembly 620, in which case reflecting light guide enclosure 625 will have a tapering geometry to collect the emitted light and direct it to the windows 701, 703, and 705. Reflecting light guide enclosure 625 may be pre-fabricated and installed separately.

In certain embodiments, a surface opposite surfaces 116, 216, and 316 is coated with a thin film of optically-reflecting material such that any light that penetrates the bar is reflected back to surfaces 116, 216, and 316. The illumination may be provided by an array of LED emitters 621, whose light emission may be directed by lenses, mirrors, or other means such as to illuminate surfaces 116, 216, and 316.

Method of Coupling Multiple Wavelengths of Optical Illumination to Fundamental Measurement The illumination of the ensemble of mechanical resonators may be provided by an array of LED emitters 621 each emitting a different wavelength of light and whose light is directed onto the mechanical resonators of mass detection system 600 from a short distance by a suitable array of lenses or mirrors. These elements, as illustrated in FIG. 8, may be microfabricated by techniques similar to those used for the fabrication of the resonator itself, and may therefore be incorporated into the manufacture of the device. LED emitters 621 in the array will be connected to separate power control circuits. By applying power to one or another LED, light of different wavelengths may be generated and directed onto the ensemble of mechanical resonators.

Method of Creating "Baseline Reference" and "Optical Intensity Reference" Measurements By means of a system of lenses or mirrors which direct light from the array of LED optical sources to the mechanical oscillator, a fraction of that light may also be directed onto the two reference oscillator elements of system baseline reference detector 210' and system intensity reference detector 310'. These two reference elements may be adjacent to each other; but may be separated from the particulate collector element. In this way, the particulate collector element may be influenced by the precipitation of particulates from the sample air stream to be analyzed, while the reference elements may be remote from, or shielded from, this precipitation.

Detection of Small Frequency Changes in Synchronism with Modulation of Illumination If the illumination is modulated, such as by repeating on-off pattern by switching the power to the LED emitters 621 on and off, then the changes in resonant frequency will follow the pattern of {illumination-heating-change in resonator elasticity}. Since the mechanical dimensions of the system are extremely small, the change in resonator frequency will quickly follow the illumination and heating. Thus, the LED illumination may be modulated (switched on and off) at a suitable rate, and the change in resonator frequency may be detected in synchronism at this rate.

The resonant elements will generate signals in the form of changes in oscillation frequency, in synchronism with the modulation (on-off switching) of power to the optical illumination. By detecting these signals in synchronism with the optical modulation, the influence of other environmental parameters (such as air temperature, relative humidity, etc.) will be minimized, since those influences are not modulated in synchronism with the LED illumination. The technique of modulation and synchronous detection is widely used to measure small signals in the presence of large backgrounds.

An attribute of this system that is particularly advantageous is that the data outputs are the differences between "sensing" elements (mass detection system balance 110') and "reference" elements (system baseline reference detector 210' and system intensity reference detector 310') which are closely identical except for the presence or absence of collected particulates or other optical absorption. The intrinsic response of a single element may be influenced by overall environmental parameters such as air pressure; ambient temperature; relative humidity; etc. Consequently, it may be difficult to discriminate a small change in resonant frequency due the presence of, or optical absorption of, a small accumulation of particulates: relative to possibly-larger changes in resonant frequency due to overall changes in the environmental parameters mentioned above. However, if the system determines the difference between a 'sensing' element and a 'reference' element, it is possible to detect relative changes whose magnitude may be much smaller than the shifts in response due to changes in environmental conditions. If the resonant frequency of the oscillating element is on the order of gigahertz, it is difficult to measure this with great precision unless the associated electronics are themselves frequency-stable at the level of parts per billion. Stability of this degree requires highly sophisticated (and consequently bulky, expensive, and power-consuming) external electronic systems. On the other hand, the system described above is determining the difference in frequency ('beat frequency') between two almost-similar elements. If these elements differ in resonant frequency by one part per million, this will be represented by a frequency difference ('beat') on the order of kilohertz. This is easily measured by common consumer electronics systems. While it would not be possible to use common consumer electronics systems to provide an accurate measurement of a one-part-per-million change in the gigahertz resonant frequency of the oscillator described above: these systems can readily measure a 'beat frequency' signal of one kilohertz created from the difference in resonant frequency of two such elements. This greatly improves the ability to resolve small changes induced firstly by the accumulation of particulates; secondly by the absorption of light by said particulates; and thirdly by the rate of change of said absorption, due to the rate of increase of the deposit of accumulated particulates.

Example of Operational Measurement Sequence

As an example, without limitation, the following sequence of actions would permit the detection and speciation of airborne particulates using mass detection system 600. The actions are carried out by an appropriately programmed processor programmed in computer 120 to perform the steps described below.

The 'units of time' are arbitrary, and are used only for the visualization of the sequencing. The 'measurement cycle' is the repetition period between repeats of the identical steps.

Step 1: Thermophoretic heating element 115 is turned OFF, all LED emitters 621 are turned OFF. Three pairwise 'beat frequencies' are measured as the difference in resonant frequencies between combinations of the 3 oscillators.

Step 2: Thermophoretic heating element 115 is switched ON to begin precipitation of particulates onto surface 116.

Step 3: Three pairwise 'beat frequencies' are measured as the difference in resonant frequencies between combinations of the 3 oscillators. These frequencies may change due to the transfer of heat from the thermophoretic heater.

Step 4: Thermophoretic heating element 115 is switched OFF. Three pairwise 'beat frequencies' are measured as the difference in resonant frequencies between combinations of the 3 oscillators. Allow mass detection system 600 to cool for a precise and known period of time, to temperature of ambient air (in case of any heat transfer from thermophoretic element to the oscillators). As the system cools, the 'beat frequency' between system baseline reference detector 210' and system intensity reference detector 310', will return to a value close to that measured in Step 1.

Step 5: A select number of LED emitters 621 are turned ON to produce light at a wavelength L1 Three pairwise 'beat frequencies' are measured as the difference in resonant frequencies between combinations of the 3 oscillators. All LED emitters 621 are then turned OFF, and three pairwise 'beat frequencies' are measured as the difference in resonant frequencies between combinations of the 3 oscillators. This step is repeated for a precise and known period of time to determine the shifts in beat frequencies attributable to the illumination provided by the select number of LED emitters 621 at wavelength L1.

Step 6: Step 5 is repeated for different ones of the for the multiplicity of LED emitters 621, from L(2) to L(N), to determine wavelength dependent absorption by the particulates.

Step 7: All LED emitters 621 are turned OFF.

Step 8: Return to Step 1. Repeat all actions for precise and known periods of time, so that the time intervals between each action in Steps 5 and 6 are constant from one measurement cycle to the next.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A system for measuring one or more properties of a sample of collected particulates, said system comprising:
    a first resonator including a first surface configured to accept the sample and a first electronic oscillator circuit having a first output proportional to a first natural resonant frequency of the first resonator;
    a second resonator including a second surface and a second electronic oscillator circuit having a second output proportional to a second natural resonant frequency of the second resonator;
    a third resonator including a third surface having an optical coating and a third electronic oscillator circuit having a third output proportional to a third natural resonant frequency of the third resonator;
    a source of electromagnetic radiation configured to illuminate the first surface, the second surface, and the third surface; and
    a processor programmed to
        control the illumination of the first surface, the second surface, and the third surface by the source of electromagnetic radiation,
        accept the first output, the second output, and the third output, and
        determine at least one property of the one or more properties of the sample accepted on the first surface.

2. The system of claim 1, where said source of electromagnetic radiation includes:
    a first source of electromagnetic radiation to illuminate the first surface;
    a second source of electromagnetic radiation to illuminate the second surface; and
    a third source of electromagnetic radiation to illuminate the third surface.

3. The system of claim 1, where said source of electromagnetic radiation simultaneously illuminates the first surface, the second surface, and the third surface.

4. The system of claim 1, where said processor is programmed to compute a first difference between the first output and the second output, a second difference between the first output and the second output, and a third difference between the second output and the third output, and to determine the property of the sample accepted on the first surface from the first difference, the second difference, and the third difference.

5. The system of claim 1, where said processor is programmed to control the wavelength of the electromagnetic radiation in a temporal sequence of wavelengths and to determine at least one property of the one or more properties of the sample accepted on the first surface at each wavelength of the temporal sequence of wavelengths.

6. The system of claim 1, where at least one property of the one or more properties is an identification of types of particulates of the sample accepted on the first surface.

7. The system of claim 1, where said first resonator includes a thermophoretic element to increase the rate at which the first surface accepts the sample.

8. The system of claim 1, where said at least one property includes an optical absorption of the sample or a mass of the sample.

9. A system for measuring one or more properties of a sample of collected particulates, said system comprising:
    two or more resonators each including a surface, an electronic oscillator circuit having an output proportional to a natural resonant frequency of the resonator, and an associated source of electromagnetic radiation configured to illuminate the surface,
    where a first resonator of the two or more resonators includes a first resonator having a first surface configured to accept the sample, and where a second resonator of the two or more resonators includes a second resonator having a second surface, where the surface of the second resonator includes an optical coating, and a processor programmed to
control the illumination of the first surface and the second surface by the source of electromagnetic radiation,
accept the output from the electronic circuit of the first resonator and the output from the electronic circuit of the second resonator, and
determine at least one property of the one or more properties of the sample accepted on the first surface.

10. The system of claim 9, where said source of electromagnetic radiation includes:
a first source of electromagnetic radiation to illuminate the first surface;
a second source of electromagnetic radiation to illuminate the second surface.

11. The system of claim 9, where said source of electromagnetic radiation simultaneously illuminates the surface of the first resonator and the surface of the second resonator.

12. The system of claim 9, where said processor is programmed to compute a difference between the first output and the second output, and to determine the property of the sample accepted on the first surface from the difference.

13. The system of claim 9, where said processor is programmed to control the wavelength of the electromagnetic radiation in a temporal sequence of wavelengths and to determine at least one of the one or more properties of the sample accepted on the first surface at each wavelength of the temporal sequence of wavelengths.

14. The system of claim 9, where at least one property of the one or more properties is an identification of types of particulates of the sample accepted on the first surface.

15. The system of claim 9, where said first resonator includes a thermophoretic element to increase the rate at which the first surface accepts the sample.

16. The system of claim 9, where said at least one property includes an optical absorption of the sample or a mass of the sample.

17. A method for measuring one or more properties of a sample of collected particulates with a device including a computer, one or more resonators, and one or more electronic oscillator circuits having an output proportional to a natural resonant frequency of the resonator, said method comprising:
measuring a first natural resonant frequency of a first resonator with an electronic oscillator circuit, where the first resonator includes a surface having collected particulates, where the measuring is performed while the surface is illuminated with electromagnetic radiation of a first wavelength that is at least partially absorbed by the collected particulates;
measuring a second natural resonant frequency of a second resonator with an electronic oscillator circuit, where the second resonator does have collected particulates, where the measuring is performed while the surface is illuminated with electromagnetic radiation of the first wavelength;
measuring a third natural resonant frequency of a third resonator with an electronic oscillator circuit, where the third resonator has an optical coating on the surface and does not include collected particulates, and were the measuring is performed while the surface is illuminated with electromagnetic radiation at the first wavelength; and
determining, according to programming of the computer, at least one property of the one or more properties of the sample accepted on the first surface.

18. The method of claim 17, where said measuring the first natural resonant frequency, the second natural resonant frequency, and the third natural resonant frequency are performed on the same resonator.

19. The method of claim 17, where the measuring steps are performed at two or more different wavelengths of electromagnetic radiation, and where said determining determines a wavelength dependent property of the one or more properties.

20. The method of claim 17, where said processor is programmed to compute a first difference between the first natural resonant frequency and the second natural resonant frequency, a second difference between the first natural resonant frequency and the second natural resonant frequency, and a third difference between the second natural resonant frequency and the third natural resonant frequency, and to determine the property of the sample accepted on the first surface from the first difference, the second difference, and the third difference.

21. The method of claim 17, where said processor is programmed to vary the first wavelength in a temporal sequence of wavelengths and to determine at least one of the one or more properties of the sample accepted on the first surface at each wavelength of the temporal sequence of wavelengths.

22. The method of claim 17, where at least one property of the one or more properties is an identification of types of particulates of the sample accepted on the first surface.

23. The method of claim 17, where said first resonator includes a thermophoretic element to increase the rate at which the first surface accepts the sample.

24. The method of claim 17, where said at least one property includes an optical absorption of the sample or a mass of the sample.

* * * * *